United States Patent
Gu et al.

(10) Patent No.: US 10,373,332 B2
(45) Date of Patent: Aug. 6, 2019

(54) SYSTEMS AND METHODS FOR DYNAMIC FACIAL ANALYSIS USING A RECURRENT NEURAL NETWORK

(71) Applicant: NVIDIA Corporation, Santa Clara, CA (US)

(72) Inventors: Jinwei Gu, San Jose, CA (US); Xiaodong Yang, San Jose, CA (US); Shalini De Mello, San Francisco, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/836,549

(22) Filed: Dec. 8, 2017

(65) Prior Publication Data

US 2019/0180469 A1 Jun. 13, 2019

(51) Int. Cl.
*G06T 3/40* (2006.01)
*G06T 13/40* (2011.01)
*G06N 3/08* (2006.01)
*G06T 7/73* (2017.01)

(52) U.S. Cl.
CPC ............. *G06T 7/73* (2017.01); *G06N 3/08* (2013.01); *G06T 3/4046* (2013.01); *G06T 13/40* (2013.01); *G06T 2207/10016* (2013.01); *G06T 2207/20081* (2013.01); *G06T 2207/20084* (2013.01);
(Continued)

(58) Field of Classification Search
CPC ............. G06T 7/73; G06T 2207/20084; G06T 3/4046; G06T 9/002
See application file for complete search history.

(56) References Cited

U.S. PATENT DOCUMENTS 6,671,391 B1 * 12/2003 Zhang ................ G06K 9/00228
382/118
7,027,618 B2 * 4/2006 Trajkovic ........... G06K 9/00221
348/154
(Continued)

FOREIGN PATENT DOCUMENTS

CN     105389549 A    3/2016
CN     106203376 A    12/2016
(Continued)

OTHER PUBLICATIONS

He et al., "Multi View Facial Action Unit Detection based on CNN and BLSTM-RNN," IEEE 12th International Conference on Automatic Face & Gesture Recognition, 2017, pp. 848-853.
(Continued)

*Primary Examiner* — Santiago Garcia
(74) *Attorney, Agent, or Firm* — Leydig, Voit & Mayer, Ltd.

(57) ABSTRACT

A method, computer readable medium, and system are disclosed for dynamic facial analysis. The method includes the steps of receiving video data representing a sequence of image frames including at least one head and extracting, by a neural network, spatial features comprising pitch, yaw, and roll angles of the at least one head from the video data. The method also includes the step of processing, by a recurrent neural network, the spatial features for two or more image frames in the sequence of image frames to produce head pose estimates for the at least one head.

20 Claims, 11 Drawing Sheets

(52) U.S. Cl.
CPC ............... *G06T 2207/30201* (2013.01); *G06T 2207/30204* (2013.01)

(56) References Cited

U.S. PATENT DOCUMENTS

| | | | |
|---|---|---|---|
| 2010/0265074 A1* | 10/2010 | Namba | G06K 9/00771 |
| | | | 340/576 |
| 2012/0075483 A1* | 3/2012 | Paoletti | A61B 5/4561 |
| | | | 348/207.1 |
| 2014/0205140 A1* | 7/2014 | Lovberg | G06T 7/248 |
| | | | 382/103 |
| 2016/0224852 A1* | 8/2016 | Vicente | G06K 9/00845 |
| 2017/0061253 A1* | 3/2017 | Burgos | G06T 7/70 |
| 2017/0098122 A1* | 4/2017 | el Kaliouby | A61B 5/744 |
| 2017/0178346 A1 | 6/2017 | Ferro et al. | |
| 2017/0193286 A1 | 7/2017 | Zhou et al. | |
| 2017/0206405 A1 | 7/2017 | Molchanov et al. | |
| 2017/0255832 A1 | 9/2017 | Jones et al. | |
| 2018/0082144 A1* | 3/2018 | Wakamatsu | G06K 9/3241 |
| 2018/0232048 A1* | 8/2018 | Popovich | A61B 3/113 |
| 2018/0293754 A1* | 10/2018 | Ahuja | G06T 7/74 |
| 2018/0293755 A1* | 10/2018 | Ahuja | G06T 7/74 |
| 2018/0307303 A1* | 10/2018 | Powderly | G06F 3/011 |
| 2018/0336332 A1* | 11/2018 | Singh | G06F 21/32 |
| 2018/0336399 A1* | 11/2018 | Gernoth | G06K 9/00288 |

FOREIGN PATENT DOCUMENTS

| | | |
|---|---|---|
| CN | 106447625 A | 2/2017 |
| CN | 106650581 A | 5/2017 |
| CN | 106845377 A | 6/2017 |
| CN | 106980811 A | 7/2017 |
| CN | 107038422 A | 8/2017 |
| WO | 2016120634 A2 | 8/2016 |

OTHER PUBLICATIONS

Borghi et al., "Embedded Recurrent Network for Head Pose Estimation in Car," Intelligent Vehicles Symposium (IV), 2017 IEEE, Jun. 2017, pp. 1-6.

Coskun, H., "Human Pose Estimation with CNNs and LSTMs," Master's Thesis, Aug. 15, 2016, 70 pages.

Chen et al., "Recurrent Human Pose Estimation," CS231A Project, Stanford University, 2016, pp. 1-7.

Peng et al., "A Recurrent Encoder-Decoder Network for Sequential Face Alignment," European Conference on Computer Vision, 2016, pp. 1-12.

Feng et al. "Learning Effective Gait Features Using LSTM," 23rd International Conference on Pattern Recognition, Dec. 4-8, 2016, pp. 325-330.

\* cited by examiner

SYSTEMS AND METHODS FOR DYNAMIC FACIAL ANALYSIS USING A RECURRENT NEURAL NETWORK

FIELD OF THE INVENTION

The present invention relates to facial analysis, and more particularly to facial analysis using neural networks.

BACKGROUND

Facial analysis of video image data is used for facial animation capture, human activity recognition, and human-computer interaction. Facial analysis typically includes head pose estimation and facial landmark localization. Facial analysis in videos is key for many applications such as facial animation capture, driver assistance systems, and human-computer interaction. Conventional techniques for facial analysis in videos estimate facial properties for individual frames and then refine the estimates using temporal Bayesian filtering. The two inter-related tasks of visual estimation and temporal tracking are isolated and careful manual model designing and parameter tuning for the Bayesian filtering is required. There is a need for addressing these issues and/or other issues associated with the prior art.

SUMMARY

A method, computer readable medium, and system are disclosed for performing dynamic facial analysis in videos. The method includes the steps of receiving video data representing a sequence of image frames including at least one head and extracting, by a neural network, spatial features comprising pitch, yaw, and roll angles of the at least one head from the video data. The method also includes the step of processing, by a recurrent neural network, the spatial features for two or more image frames in the sequence of image frames to produce head pose estimates for the at least one head.

DETAILED DESCRIPTION

The present disclosure describes a facial analysis system including a neural network and recurrent neural network (RNN) for dynamic estimation and tracking of facial features in video image data. The facial analysis system receives color data (e.g., RGB component values), without depth, as an input and is trained using a large-scale synthetic dataset to estimate and track either head poses or three-dimensional (3D) positions of facial landmarks. In other words, the same facial analysis system may be trained for estimating and tracking either head poses or 3D facial landmarks. In the context of the following description a head pose estimate is defined by a pitch, yaw, and roll angle. In one embodiment, the neural network is a convolutional neural network (CNN). In one embodiment, the RNN is used for both estimation and tracking of facial features in videos. In contrast with conventional techniques for facial analysis of videos, the required parameters for tracking are learned automatically from training data. Additionally, the facial analysis system provides a holistic solution for both visual estimation and temporal tracking of various types of facial features from consecutive frames of video.

Figure 1A:
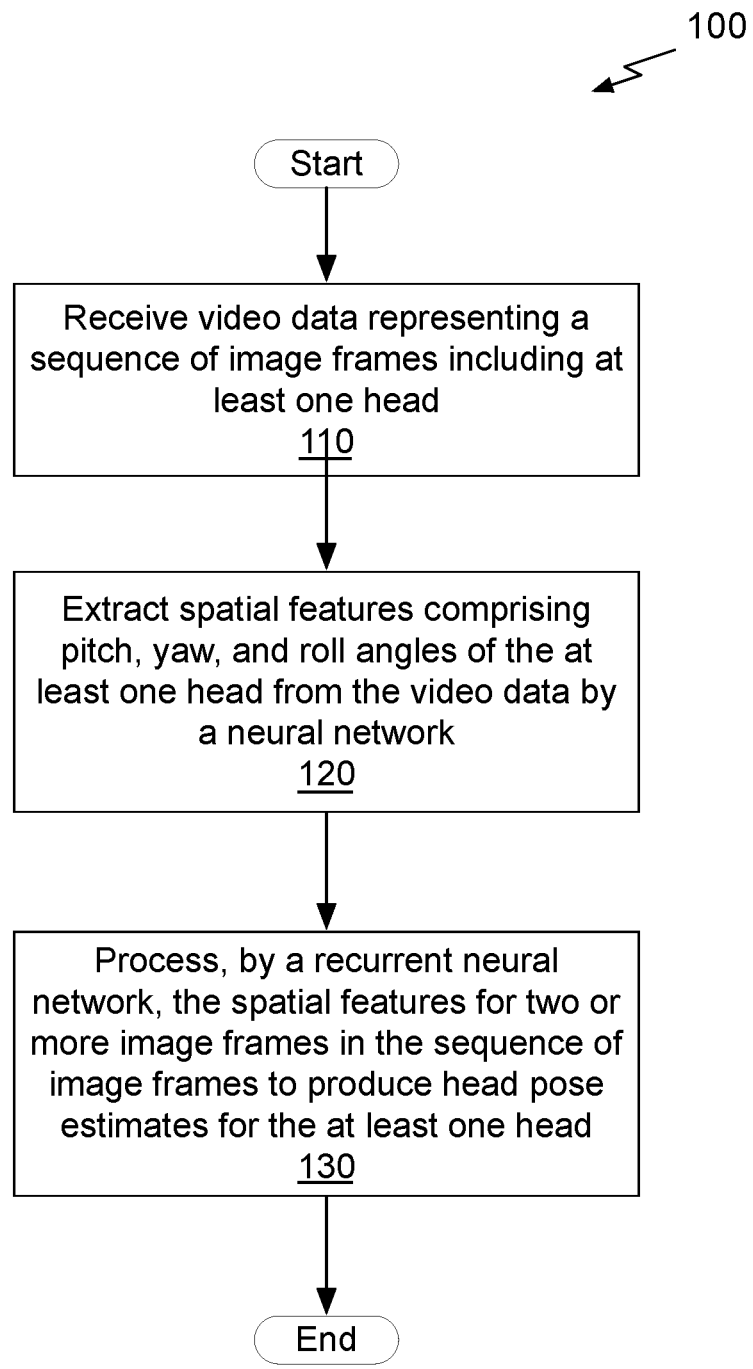
FIG. 1A illustrates a flowchart of a method for performing dynamic facial analysis in videos, in accordance with one embodiment.

FIG. 1 illustrates a flowchart of a method 100 for dynamic facial analysis, in accordance with one embodiment. The method 100 may be performed by a program, custom circuitry, or by a combination of custom circuitry and a program. For example, the method 100 may be executed by a GPU (graphics processing unit), CPU (central processing unit), neural network, or any processor capable of executing the facial analysis framework. Furthermore, persons of ordinary skill in the art will understand that any system that performs method 100 is within the scope and spirit of embodiments of the present invention.

At step 110, video data representing a sequence of image frames including at least one head is received. In one embodiment, the video data comprises color data, such as red, green, and blue component values for each pixel in each one of the image frames. In one embodiment, the video data does not include depth data for each image frame. In one embodiment, the video data are real-time images captured by a camera. In one embodiment, the video data is included in a training dataset. In one embodiment, the training dataset is a synthetic training dataset that includes accurate labels for both head pose and facial landmarks. In one embodiment, the synthetic training dataset includes over 500,000 frames of video data.

At step 120, spatial features comprising pitch, yaw, and roll angles of the at least one head are extracted from the video data by a neural network. In one embodiment, the neural network is a convolutional neural network (CNN). In one embodiment, the CNN comprises a vision geometry group (VGG16) neural network. In the context of the following description the pitch, yaw, and roll angles define an estimate of the head pose in the video data.

At step 130, the spatial features for two or more image frames in the sequence of image frames are processed by a recurrent neural network (RNN) to produce head pose estimate for the at least one head. In one embodiment, the RNN is a gated recurrent unit (GRU) neural network. In one embodiment, the RNN is a long short-term memory (LSTM) neural network. In one embodiment, the RNN is a fully connected RNN (FC-RNN). In one embodiment, the neural network is trained separately from the RNN. In one embodiment, the neural network and the RNN are each trained to estimate and track head poses in the video data. In one embodiment, the neural network and the RNN are each trained to estimate and track three-dimensional (3D) facial landmarks in the video data. In the context of the following description a facial landmark is a 3D position in space corresponding to a location on a head.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
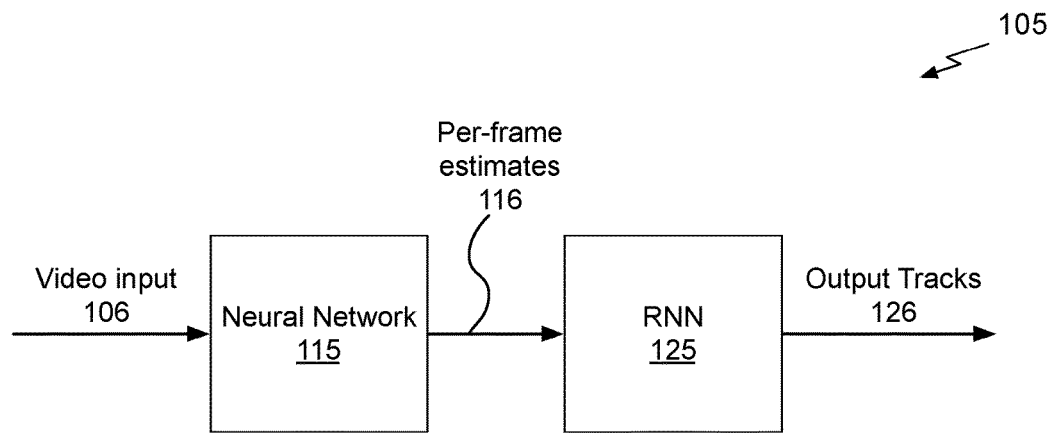
FIG. 1B illustrates a block diagram of a system for dynamic facial analysis of video data, in accordance with one embodiment.

FIG. 1B illustrates a block diagram of a system 105 for dynamic facial analysis of video data, in accordance with one embodiment. The system 105 may be configured to perform the method 100 of FIG. 1A. The system 105 includes a neural network 115 and a RNN 125. The neural network 115 and/or the RNN 125 may be implemented by a graphics processor or any processor capable of performing the necessary operations of the method 100. The system 105 provides a generalized and integrated solution for estimation and tracking of various facial features for dynamic facial analysis.

The neural network 115 receives video input 106 that comprises video data representing a sequence of image frames including at least one head. The neural network 115 extracts spatial features from the video input 106 and produces per-frame estimates 116. In one embodiment, the per-frame estimates 116 are per-frame head pose estimates. In another embodiment, the per-frame estimates 116 are per-frame facial landmark estimates. The per-frame estimates 116 comprises pitch, yaw, and roll angles of the at least one head for each frame of the video input 106. The RNN 125 processes the per-frame estimates 116 and produces tracking data, specifically, output tracks 126. In the context of the following description, output tracks are stabilized and denoised estimates for each of the frames in the entire sequence of image frames. In one embodiment, the tracking data are head pose tracking data. In another embodiment, the tracking data are facial landmark tracking data.

In one embodiment, the video input 106 includes at least a portion of a first training dataset when the neural network 115 and the RNN 125 are trained, separately or together, to estimate and track head poses in the video input 106. In another embodiment, the video input 106 includes at least a portion of a second training dataset when the neural network 115 and the RNN 125 are trained, separately or together, to estimate and track 3D facial landmarks in the video input 106. The first training dataset may correspond to head poses and the second training dataset may correspond to facial landmarks. In one embodiment, during training, the 3D facial landmarks are directly regressed in a single pass through the neural network 115 and the RNN 125. In contrast, conventional techniques for training a facial landmark tracking system require spatial recurrent learning to progressively refine predictions in multiple passes through the facial landmark tracking system. The single pass provides a significant advantage in terms of computational cost and performance compared with conventional techniques.

The frames of video data may be encoded as a multi-dimensional tensor in dimensions of x and y (e.g., frame size in pixels), channels (e.g., RGB), and temporal length (e.g., frame number). The neural network 115 may be configured to perform convolution in the spatial and temporal domains and maximum pooling operations to process the video data before using one or more fully connected layers to produce the per-frame estimates 116.

The RNN 125 provides a learning-based approach for time series prediction. In one embodiment, the RNN 125 is implemented using a long short-term memory (LSTM) to adaptively discover temporal dependencies at different time scales. In one embodiment, the RNN 125 is implemented using a gated recurrent unit (GRU) to adaptively discover temporal dependencies at different time scales. The RNN 125 is a sequence-based model that captures temporal evolution, maintaining a recurrent hidden state for time step t, $h_t$, whose activation depends on that of the previous time step t−1. In one embodiment, $h_t$ is computed as:

$$h_t = \mathcal{H}(W_{hh}h_{t-1} + W_{ih}x_t + b_h) \quad (1)$$

where $\mathcal{H}$ is an activation function, $W_{hh}$ is the hidden-to-hidden matrix, $h_{t-1}$ is the hidden state from the previous time step, $W_{ih}$ is the input-to-hidden matrix, $x_t$ is the input to the current layer of the RNN 125, and $b_h$ is a bias value. A target output $y_t$ is given by $y_t = W_{ho}h_t + b_o$. Consider a linear activation function $\mathcal{H}(x) = x$ and subsume the bias term $b_h$ into the hidden state h, and Equation (1) can be simplified to:

$$h_t = W_{hh}h_{t-1} + W_{ih}x_t, \quad (2)$$

where, in one embodiment, $W_{hh}$ and $W_{ih}$ are fixed after the RNN 125 is trained. In other words, the values of $W_{hh}$ and $W_{ih}$ that are determined during training are not changed or updated when the RNN 125 is deployed for classification.

The computation performed by the RNN 125 resembles Bayesian filters. However, in contrast with Bayesian filter implementations, the RNN 125 avoids tracker-engineering for computations performed on the per-frame estimates 116. The RNN 125 provides a unified approach to learn the tracking features and parameters directly from data, and therefore does not require tracker-engineering. In contrast, conventional facial analysis techniques rely on problem-specific design and user tuning of tracking, i.e., tracker engineering. For example, tracking can be performed on face bounding boxes, rigid transformation parameters of heads, or facial features. Users are required to set the parameters in Bayesian filters based on domain knowledge.

When a linear Kalman filter is used in a conventional implementation of a Bayesian filter, the optimal estimator is:

$$h_t = Wh_{t-1} + K_t(x_t - Vh_{t-1})$$

$$= (W - K_tV)h_{t-1} + K_tx_t$$

$$= W_{bh}'h_{t-1} + W_{bi}'x_t, \quad (3)$$

where $h_t$ is the state, $x_t$ is a measurement at time t, $K_t$ is the Kalman gain matrix that updates over time, W and V are the matrices for the state transition and measurement models, $W_{bh}^t = W - K_t V$ and $W_{bi}^t = K_t$ are the two weight matrices that relate $h_{t-1}$ and $x_t$ to $h_t$. With the estimated state $h_t$, the target output can be estimated as $y_t = V h_t$. The goal of Bayesian filtering is to estimate the states $h_t$ (and optionally the target output $y_t$). For the Kalman filter, $h_t|h_{t-1}$ and $x_t|h_t$ are each assumed to have a Gaussian distribution and linear models are used for state transitions and measurement (e.g., matrices W and V).

Note the similarity between Equations (1) and (3): the optimal estimate of the state $h_t$ is a weighted linear combination of the estimate of the previous state $h_{t-1}$ and the current input $x_t$. The two weight matrices for the Kalman filter are $W_{bh}^t$ and $W_{bi}^t$ and the two matrices for the RNN 125 are $W_{hh}$ and $W_{ih}$. One important difference between the RNN 125 and Bayesian filters (e.g., a Kalman filter or particle filter), is that the two weight matrices $W_{bh}^t$ and $W_{bi}^t$ change over time, indicating that the computation is an adaptive estimator. In contrast, for the RNN 125, the two learned weight matrices, $W_{hh}$ and $W_{ih}$, are usually fixed after the RNN 125 is trained.

In practice, there are two other important differences between the RNN 125 and Bayesian filters. Firstly, for Bayesian filters, most effort goes into designing the state transition and measurement models which is usually challenging for complex tracking tasks (e.g., non-rigid tracking of faces). The RNN 125 is more generally applicable to almost any tracking task, since the optimal parameters, $W_{hh}$ and $W_{ih}$, can be learned from the training data. Secondly, integrating Bayesian filters with the static estimators for generic vision tasks is also challenging. In contrast, as shown in FIG. 1B, the RNN 125 can be concatenated with the neural network 115, such as a CNN that performs frame-wise feature extraction generating per-frame estimates 116, to form the end-to-end system 105 for both estimation and tracking. The RNN 125 maps a sequence of per-frame estimates 116 to match the sequence of known ground truth output training data. In one embodiment, the neural network 115 is trained is trained for both estimation and tracking separately from the RNN 125. In another embodiment, the neural network 115 is trained for both estimation and tracking end-to-end with the RNN 125.

Figure 1C:
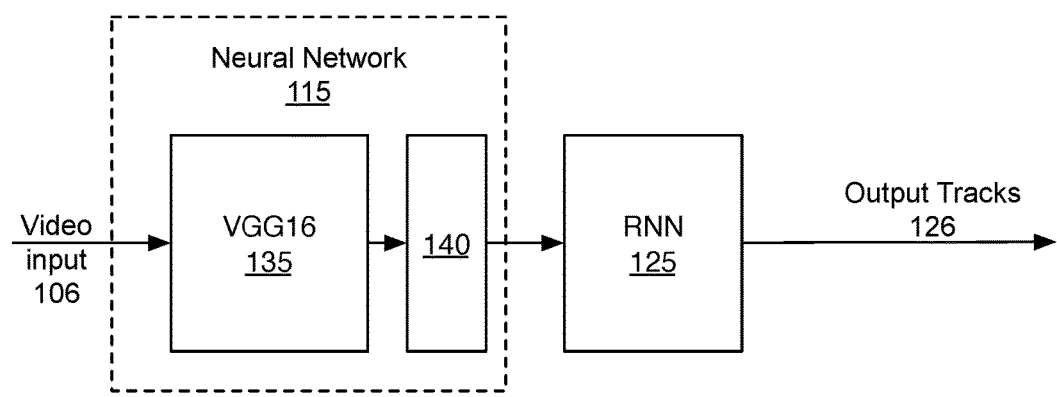
FIG. 1C illustrates another block diagram of the system for dynamic facial analysis of video data shown in FIG. 1B, in accordance with one embodiment.

FIG. 1C illustrates another block diagram of the system 105 for dynamic facial analysis of video data shown in FIG. 1B, in accordance with one embodiment. In one embodiment, the neural network 115 is a VGG16 neural network 135 and one additional fully-connected layer 140. In one embodiment, both $W_{hh}$ and $W_{ih}$ are initialized to random values and the RNN 125 is trained separately from the neural network 115. In one embodiment, the RNN 125 is pre-trained CNN with fully-connected layers that are transformed into recurrent layers.

Suppose that a pre-trained fully-connected layer at timestamp t has the structure:

$$f_t = \mathcal{H}(W_{io} x_t + b_f) \quad (4)$$

where $W_{io}$ is the pre-trained input-to-output matrix, $x_t$ is the output of the previous feed-forward layer and $b_f$ is the bias. The RNN 125 transforms a pre-trained fully-connected layer into a recurrent layer through:

$$f_t = \mathcal{H}(W_{io} x_t + W_{hh} f_{t-1} + b_f) \quad (5)$$

The RNN 125 structure, initialized with a pre-trained fully-connected layer only introduces a single hidden-to-hidden weight matrix $W_{hh}$ that needs to be trained from scratch while the other weight matrices are pre-trained and can be merely fine-tuned.

Figure 2A:
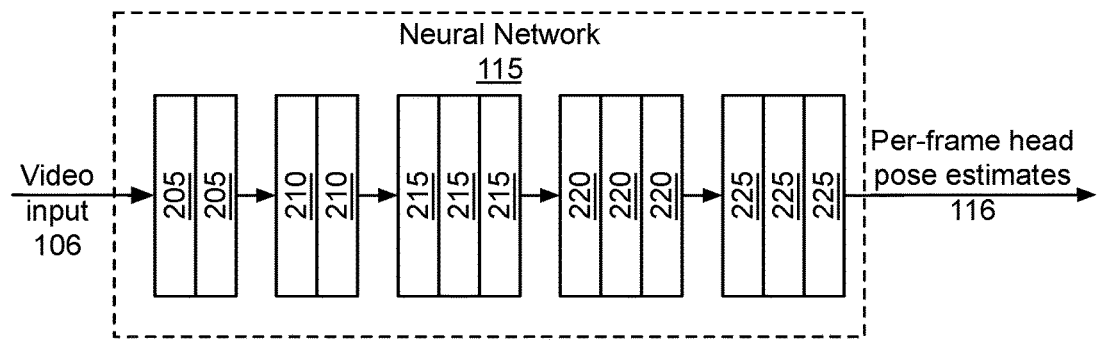
FIG. 2A illustrates a block diagram of a neural network for generating per-frame head pose estimates, in accordance with one embodiment.

FIG. 2A illustrates a block diagram of the neural network 115 for generating the per-frame head pose estimates 116, in accordance with one embodiment. In one embodiment, the neural network 115 is implemented as a CNN including 3×3 convolutional layers 205 that each include 64 neurons followed by 3×3 convolutional layers 210 that each include 128 neurons followed by 3×3 convolutional layers 215 that each include 256 neurons followed by 3×3 convolutional layers 220 that each include 512 neurons followed by 3×3 convolutional layers 225 that each include 512 neurons. The last 3×3 convolutional layer 225 generates the per-frame head pose estimates 116. In one embodiment, each group of 3×3 convolutional layers is followed by a pooling layer.

Figure 2B:
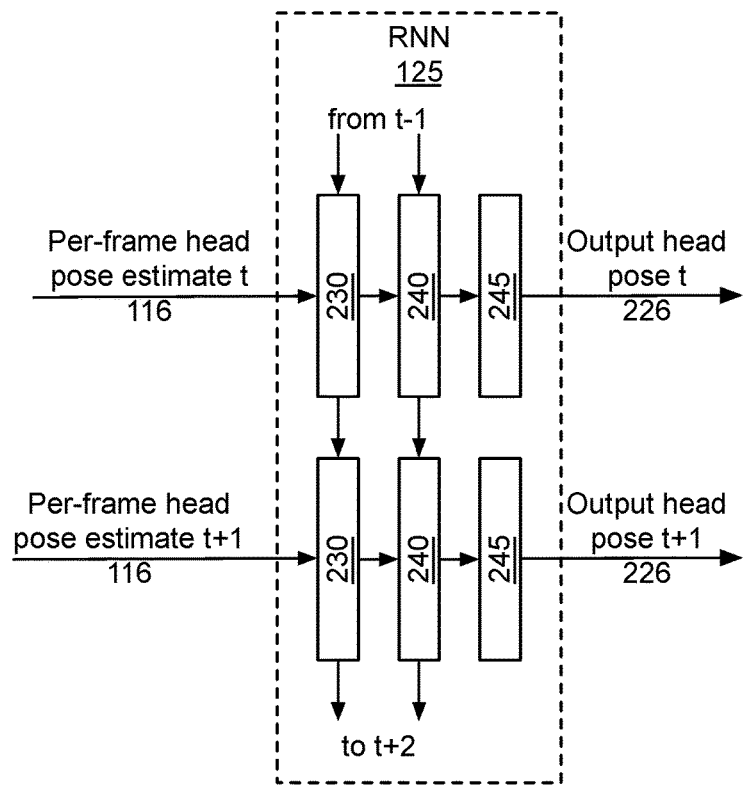
FIG. 2B illustrates a block diagram of a RNN for generating per-frame head pose estimates, in accordance with one embodiment.

FIG. 2B illustrates a block diagram of the RNN 125 for generating a stream of output head poses 226, in accordance with one embodiment. In one embodiment, the RNN 125 includes a fully-connected layer 230 that includes 4096 neurons followed by a fully-connected layer 240 that includes 4096 neurons followed by a fully-connected layer 245 that generates three values defining the output head pose 226. The three output values correspond to the pitch, yaw, and roll angles. The recurrent aspect of the RNN 125 is shown by the vertical connections indicating that output values for each of the fully connected layers 230 and 240 are fed back into each of the fully connected layers, respectively, to compute one or more subsequent output values. In one embodiment, the fully-connected layer 230 and/or 240 are a pre-trained fully-connected CNN layer that is converted into recurrent fully-connected layer using equation (5).

Figure 2C:
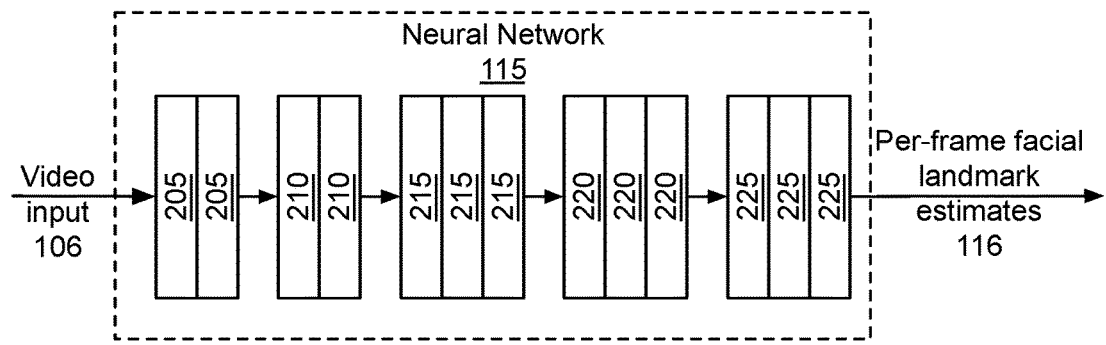
FIG. 2C illustrates a block diagram of a neural network for generating per-frame facial landmarks, in accordance with one embodiment.

FIG. 2C illustrates a block diagram of the neural network 115 for generating per-frame facial landmarks, in accordance with one embodiment. In one embodiment, the neural network 115 is implemented as a CNN including 3×3 convolutional layers 205 that each include 64 neurons followed by 3×3 convolutional layers 210 that each include 128 neurons followed by 3×3 convolutional layers 215 that each include 256 neurons followed by 3×3 convolutional layers 220 that each include 512 neurons followed by 3×3 convolutional layers 225 that each include 512 neurons. The last 3×3 convolutional layer 225 generates the per-frame facial landmark estimates 116. In one embodiment, each group of 3×3 convolutional layers is followed by a pooling layer.

Figure 2D:
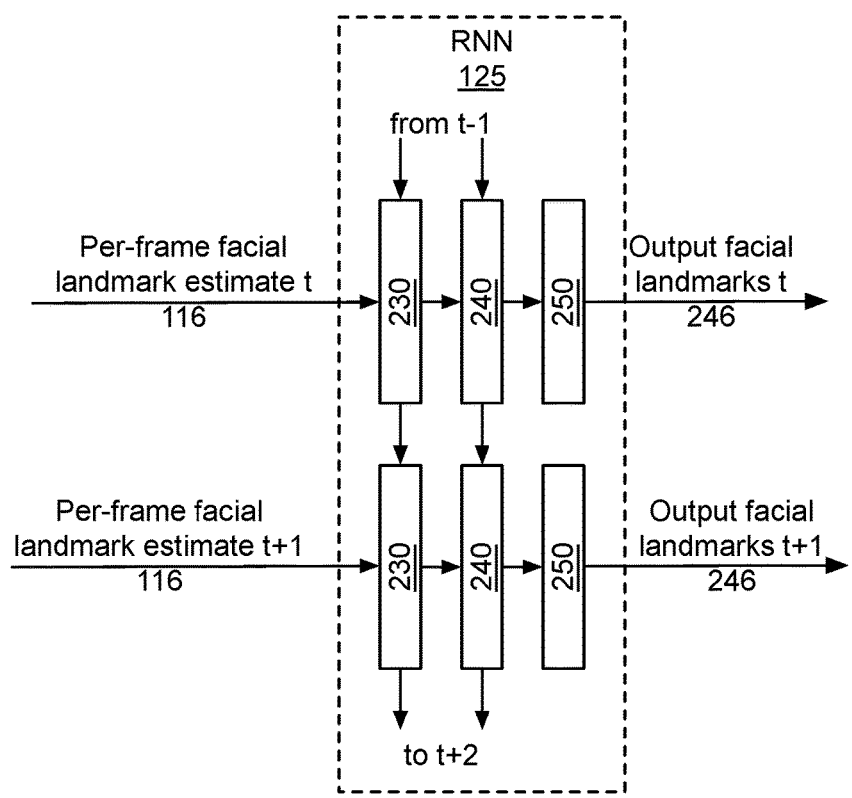
FIG. 2D illustrates a block diagram of a RNN for generating per-frame facial landmarks, in accordance with one embodiment.

FIG. 2D illustrates a block diagram of the RNN 125 for generating per-frame facial landmarks, in accordance with one embodiment. In one embodiment, the RNN 125 includes a fully-connected layer 230 that includes 4096 neurons followed by a fully-connected layer 240 that includes 4096 neurons followed by a fully-connected layer 250 that generates 136 values defining the output facial landmarks 246. The 136 output values correspond to the different 3D positions on the head.

In one embodiment, the RNN 125 is trained using a set of regularization techniques using a variational dropout to repeat the same dropout mask with 0.25 rate at each time step for both the feed-forward and recurrent connections. In contrast, conventional techniques sample different dropout masks at each time step for feed-forward connections only and use no dropout for recurrent connections. In one embodiment, soft gradient clipping is applied during training to prevent gradients from exploding for layers of the RNN 125. For example, in on embodiment, a least square errors (l2) loss function is used during training, and if the $l_2$-norm of gradients $\|g\|$ is larger than a threshold $\tau=10$, the gradients are rescaled to $g \leftarrow g\tau/\|g\|$.

In one embodiment, a large-scale synthetic head pose dataset is generated to use for training the system 105 to generate output tracks 126 (i.e., output head poses 226). In one embodiment, the large-scale synthetic head pose dataset contains 10 subjects, 70 motion tracks, and 510,960 frames in total. Generation of the large-scale synthetic head pose dataset is needed because while there are several datasets available for head pose estimation from still images, there are currently very limited video-based datasets. Due to various difficulties in ground truth collection, head pose datasets usually have errors and noises in the ground truth annotations. For example, a conventional dataset has, on an average, 1 degree of error. In contrast, the large-scale synthetic head pose dataset has accurate ground truth and includes high resolutions video sequences.

When the neural network 115 and RNN 125 are trained end-to-end the estimation error is reduced and, over time, a smoother track is generated, indicating that the system 105 learns the temporal variation of head poses in videos. In contrast, Kalman filtering (and similarly particle filtering) can only reduce the variability/noise in the per-frame estimates over time, but cannot reduce the estimation errors.

The second application for dynamic facial analysis is facial landmark localization in videos. In one embodiment, as a pre-processing step, a CNN is trained to perform face detection on every frame. For each video, the central positions of the detected facial regions are smoothed temporally with a Gaussian filter, and the maximum size of the detected bounding boxes is used to extract a face-centered sequence for use as a training dataset for the system 105. The pre-processing step stabilizes face detections over time and interpolates face regions for the few frames with missed face detection.

In one embodiment, several types of data augmentation are employed to generate the training dataset. Data augmentation may include horizontal mirroring of the images, playing the image sequences in reverse, and small random scaling and translation of the face windows. In one embodiment, an R2 loss function is used to train the RNN 125 for facial landmark localization and head pose estimation. When the RNN 125 is trained for facial landmark estimation, the output layer has 136 neurons corresponding to locations of 68 facial landmarks compared with 3 neurons corresponding to the pitch, yaw, and roll angles when the RNN 125 is trained for head pose estimation.

Figure 2E:
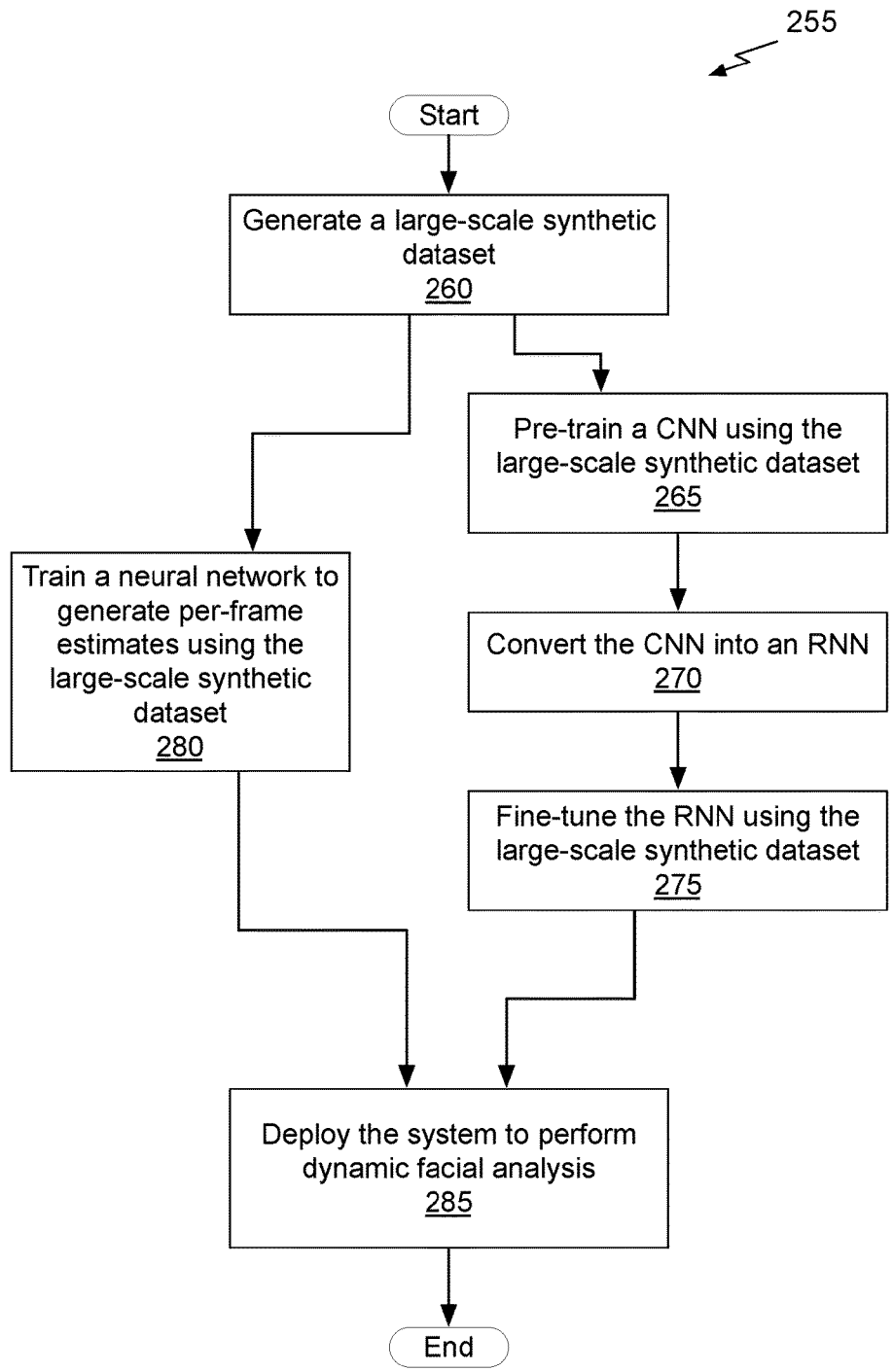
FIG. 2E illustrates another flowchart of a method for training and deploying the dynamic facial analysis systems shown in FIGS. 1B and 1C, in accordance with one embodiment.

FIG. 2E illustrates another flowchart of a method 255 for training and deploying the dynamic facial analysis system 105 shown in FIGS. 1B and 1C, in accordance with one embodiment. The method 255 may be performed by a program, custom circuitry, or by a combination of custom circuitry and a program. For example, the method 255 may be executed by the system 105, a GPU (graphics processing unit), CPU (central processing unit), neural network, or any processor capable of executing the facial analysis framework. Furthermore, persons of ordinary skill in the art will understand that any system that performs method 255 is within the scope and spirit of embodiments of the present invention.

At step 260 a large-scale synthetic dataset is generated for training a dynamic facial analysis system, such as the system 105. In one embodiment, the dataset includes a first portion of training data for training the neural network 115 and a second portion of training data for training the RNN 125. In another embodiment, the training data in the dataset is used to train both the neural network 115 and the RNN 125.

Step 280 may be completed in parallel with steps 265, 270, and 275. In one embodiment, the large-scale synthetic dataset is used to simultaneously train both the neural network 115 and the RNN 125. Alternatively, step 280 may be completed serially, before or after any of steps 265, 270, and 275. At step 280, a neural network, such as the neural network 115 is trained to generate per-frame estimates 116 using the large-scale synthetic dataset. The per-frame estimates 116 may be either per-frame head pose estimates or per-frame facial landmark estimates. During training, the per-frame estimates 116 are compared with ground truth training samples included in the large-scale synthetic dataset to compute estimate errors. Given the estimate errors, parameters in each layer of the neural network 115 are updated in the direction of error reduction. The training procedure may be repeated iteratively until a target accuracy and convergence is achieved.

At step 265, a CNN is pre-trained using the large-scale synthetic dataset. At step 270, the CNN is converted into an RNN, such as the RNN 125. In one embodiment, equation (5) is used to transform the pre-trained CNN into an RNN. At step 275, the RNN 125 is fine-tuned using the large-scale synthetic dataset to produce a trained RNN 125. At step 285, the system 105, including the trained neural network 115 and the trained RNN 125, is deployed to perform dynamic facial analysis. Importantly, when the system 105 is deployed to generate tracking data based on sequences of image frames, the system 105 operates in a single-pass manner. In other words, the tracking data that is output by the system 105 for one image frame is not provided as an input to produce the tracking data for a subsequent image frame. The single-pass operation reduces latency from when a video is input to when the tracking data is generated. The large-scale synthetic dataset increases performance, specifically accuracy of the system 105. In one embodiment, the system 105 is first trained to produce only head pose estimates and is later trained to produce only facial landmark estimates.

Figure 2F:
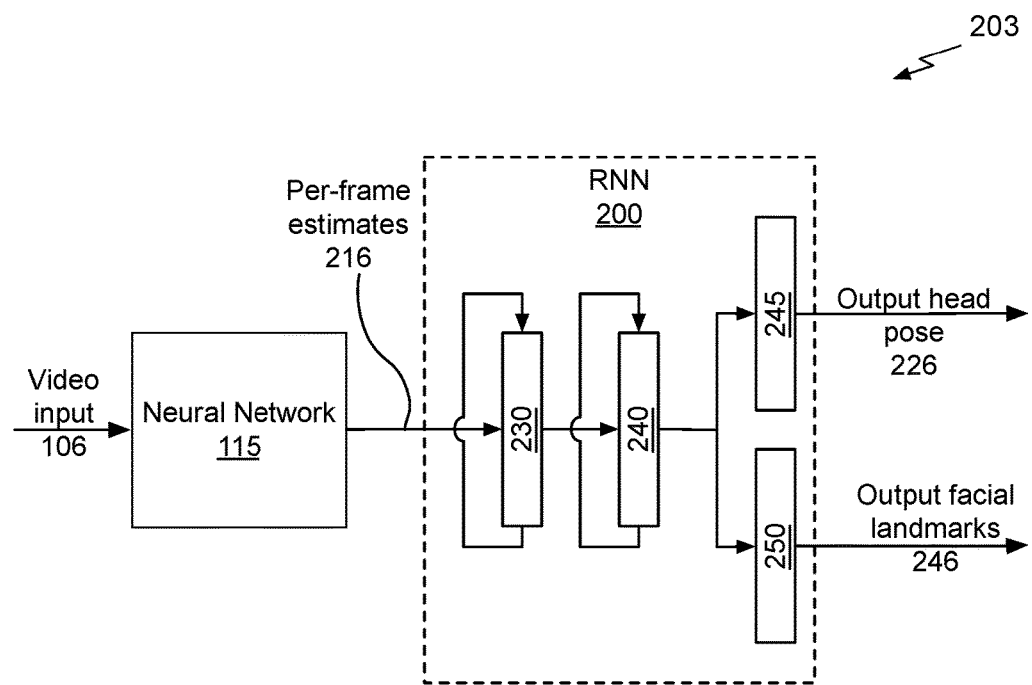
FIG. 2F illustrates yet another block diagram of a system for dynamic facial analysis of video data, in accordance with one embodiment.

FIG. 2F illustrates yet another block diagram of a system 203 for dynamic facial analysis of video data, in accordance with one embodiment. The system 203 includes the neural network 115 and an RNN 200. The neural network 115 is trained to produce per-frame estimates 216 that may include both head pose estimates and facial landmark estimates. In one embodiment, the RNN 200 includes the fully-connected layer 230 and the fully-connected layer 240. The output of the fully-connected layer 240 is provided to both the fully-connected layer 245 and 250. The fully-connected layers 230 and 240 may be trained to generate stabilized and denoised feature vectors corresponding to the image sequence in the video input 106 for both head poses and facial landmarks.

The fully-connected layer 245 generates three values defining the output head pose 226 and fully-connected layer 250 that generates 136 values defining the output facial landmarks 246. The three output values correspond to the pitch, yaw, and roll angles. The recurrent aspect of the RNN 200 is shown by the feedback connections indicating that output values for each of the fully connected layers 230 and 240 are fed back into each of the fully connected layers, respectively, to compute one or more subsequent output values. In one embodiment, the fully-connected layer 230 and/or 240 are a pre-trained fully-connected CNN layer that is converted into recurrent fully-connected layer using equation (5). In one embodiment, the RNN 200 is trained end-to-end with the neural network 115 using a single training dataset. In another embodiment, the RNN 200 is trained separately from the neural network, using a single training dataset or separate training datasets.

Compared with traditional Bayesian filters, the RNN-based system 105 learns to jointly estimate the per-frame estimates 116 (or measurements) and to temporally track the per-frame estimates 116 with a single end-to-end network provided by the neural network 115 and the RNN 125.

Moreover, the system 105 does not rely on complicated and problem-specific tracker-engineering or feature-engineering, that are required in conventional techniques. Additionally, the RNN-based system 105 provides a generic approach that can be extended to other tasks of facial analysis in videos.

The system 105 provides a generalized and integrated solution for estimation and tracking of various facial features for dynamic facial analysis. In contrast with conventional techniques that are specifically designed only for facial landmark tracking, the system 105 may be employed to perform various feature tracking and facial analysis tasks for video data, such as tracking head pose, facial landmarks, facial expression, and facial segmentation.

Parallel Processing Architecture

Figure 3:
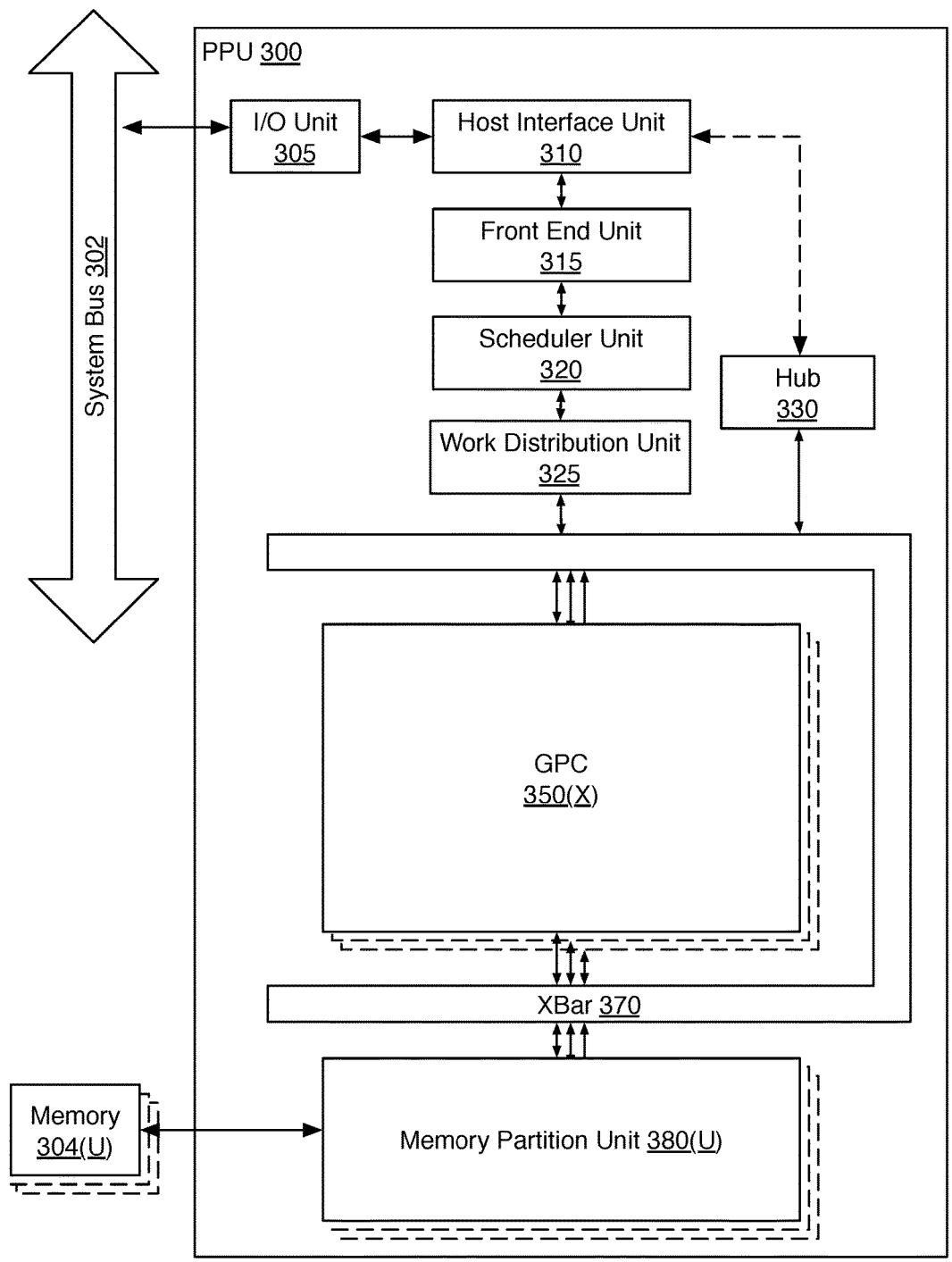
FIG. 3 illustrates a parallel processing unit, in accordance with one embodiment.

FIG. 3 illustrates a parallel processing unit (PPU) 300, in accordance with one embodiment. The PPU 300 may be configured to implement the system 105.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
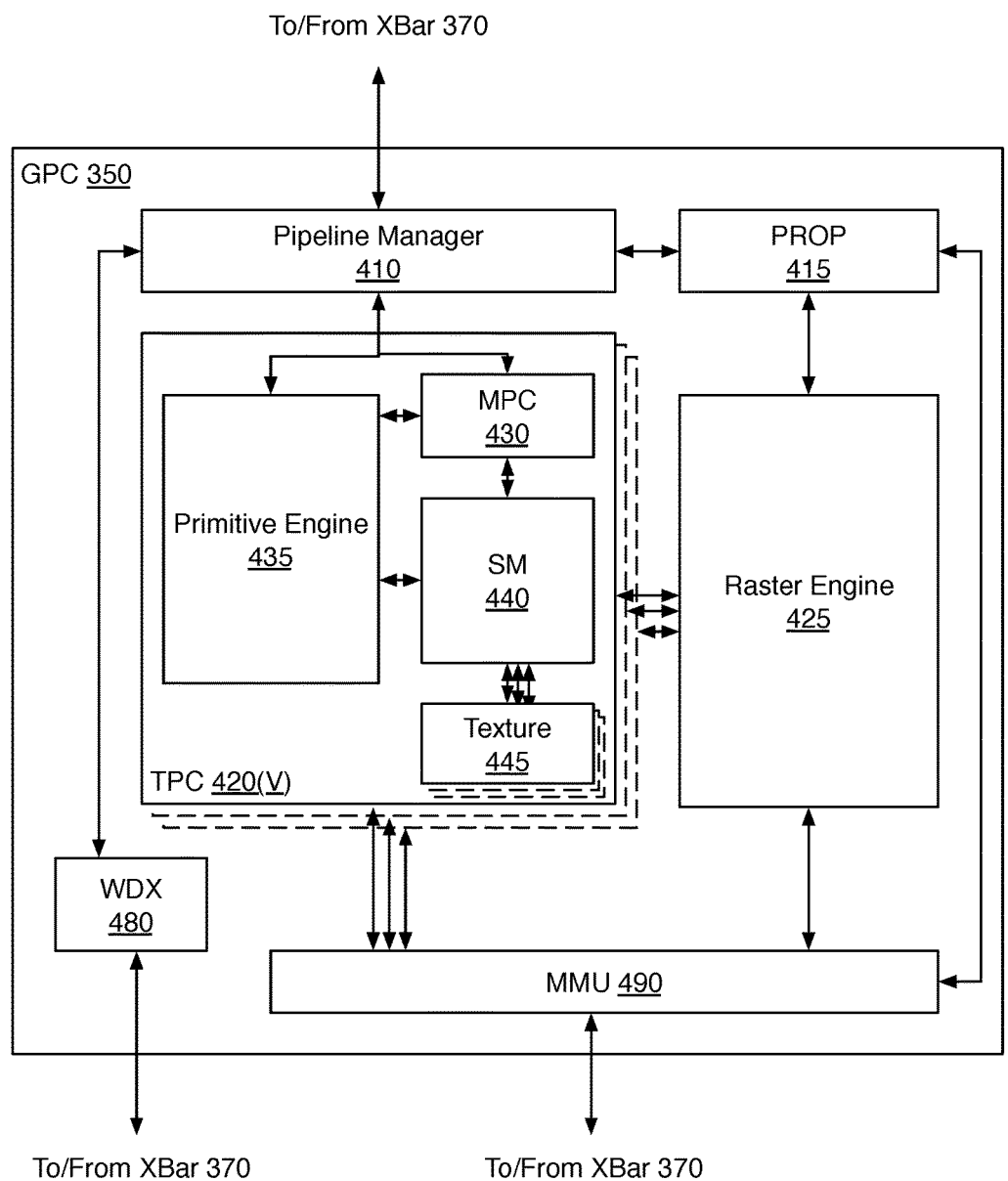
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
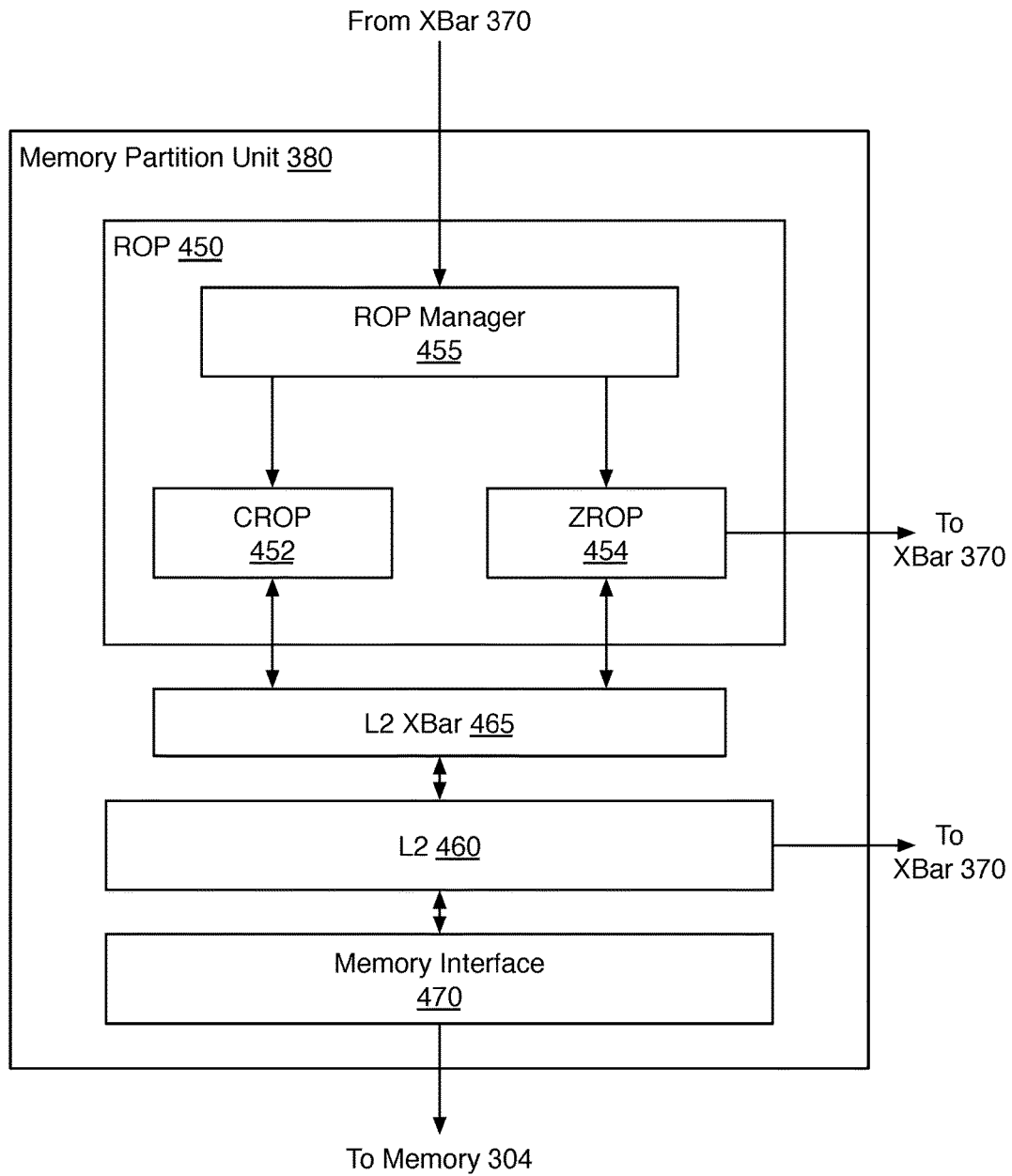
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
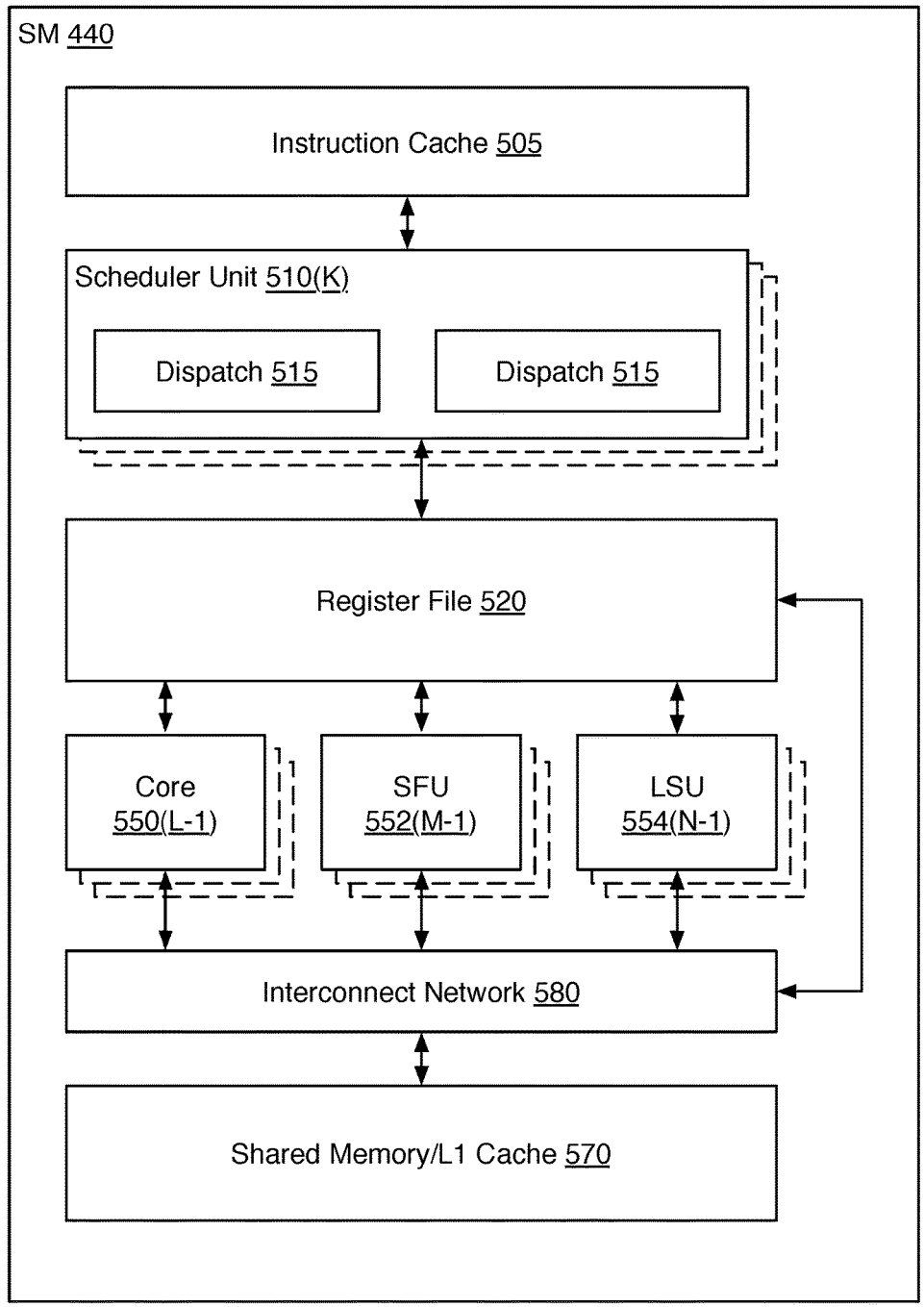
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of a neural network. For example, the device driver may launch a kernel on the PPU 300 to implement the neural network on one SM 440 (or multiple SMs 440). The device driver (or the initial kernel executed by the PPU 300) may also launch other kernels on the PPU 300 to perform other layers of the neural network. In addition, some of the layers of the neural network may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
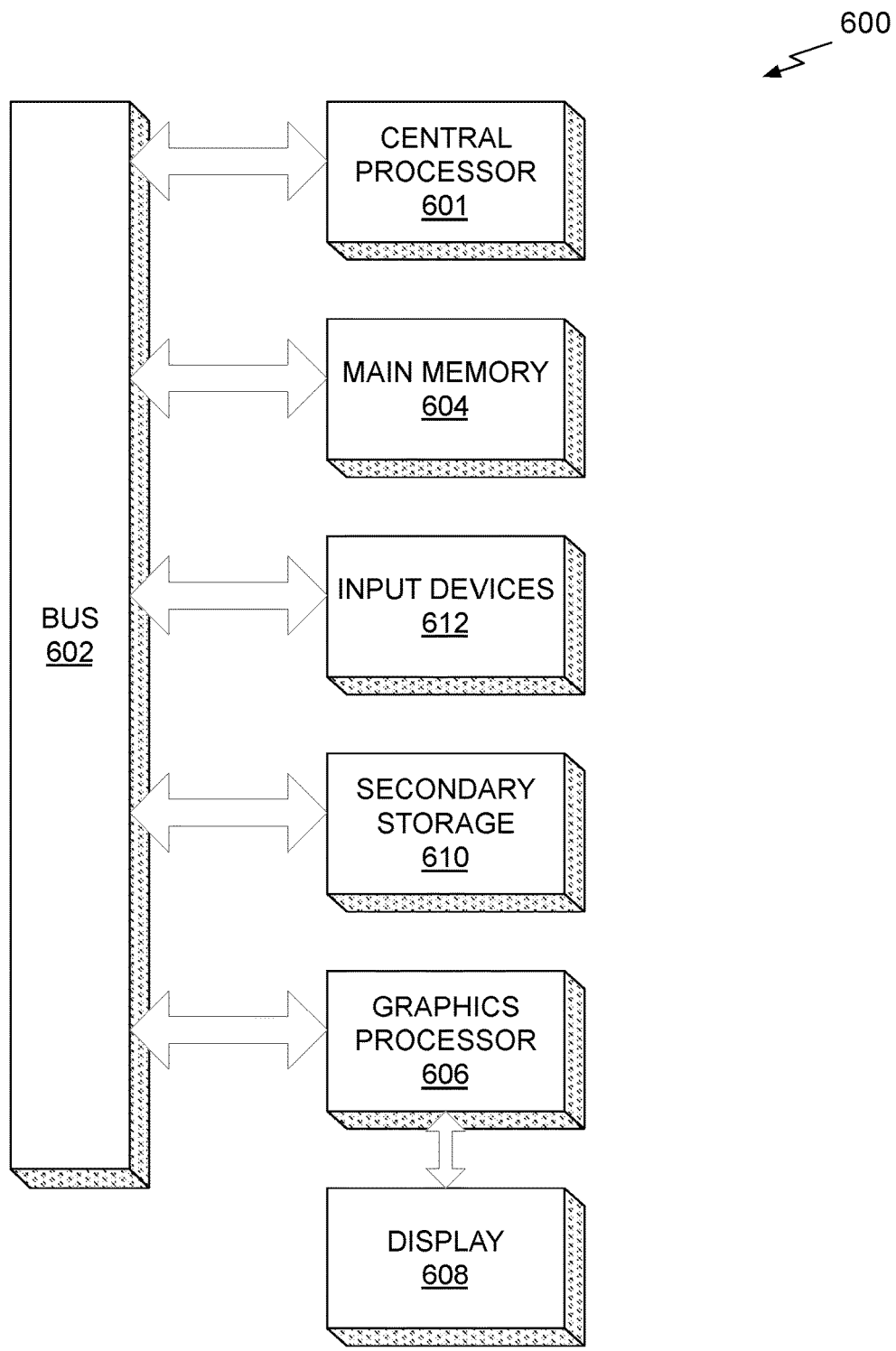
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the system 105 for dynamic facial analysis.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, head-mounted display device, an autonomous vehicle, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for facial analysis, comprising:
    transforming a fully-connected layer of a first neural network into a recurrent layer to produce a recurrent neural network (RNN), wherein, during training, the fully-connected layer learned a first weight matrix, and the recurrent layer uses the first weight matrix to process inputs to the recurrent layer and uses a second weight matrix to process hidden state produced by the recurrent layer for a previous time step;
    receiving video data representing a sequence of image frames including at least one head;
    extracting spatial features comprising pitch, yaw, and roll angles of the at least one head from the video data by a second neural network; and
    processing, by the RNN, the spatial features for two or more image frames in the sequence of image frames to produce head pose estimates for the at least one head.

2. The method of claim 1, wherein the spatial features are extracted for each image frame in the sequence of image frames.

3. The method of claim 1, wherein the second neural network is trained using a first training dataset and the RNN is trained using a second training dataset.

4. The method of claim 1, wherein the second neural network is a convolutional neural network (CNN).

5. The method of claim 1, wherein the second neural network and the RNN are simultaneously trained using one training dataset.

6. The method of claim 1, wherein the sequence of image frames includes facial landmarks associated with the at least one head and,
    the neural network extracts additional spatial features from the video data; and
    the RNN processes the additional spatial features for the two or more image frames in the sequence of image frames to produce facial landmark tracking data.

7. The method of claim 6, wherein the facial landmark tracking data comprises three-dimensional positions.

8. The method of claim 1, wherein the RNN is a fully connected RNN.

9. A facial analysis system, comprising:
    a first neural network configured to:
        receive video data representing a sequence of image frames including at least one head;
        extract spatial features comprising pitch, yaw, and roll angles of the at least one head from the video data; and
    a recurrent neural network (RNN) that is coupled to the neural network and configured to process the spatial features for two or more image frames in the sequence of image frames to produce head pose tracking data for the at least one head, wherein a fully-connected layer of a second neural network is transformed into a recurrent layer to produce the RNN, the recurrent layer using a first weight matrix to process inputs to the recurrent layer and using a second weight matrix to process hidden state produced by the recurrent layer for a previous time step, and the first matrix is learned by the fully-connected layer during training.

10. The facial analysis system of claim 9, wherein the spatial features are extracted for each image frame in the sequence of image frames.

11. The facial analysis system of claim 9, wherein the first neural network is trained using a first training dataset and the RNN is trained using a second training dataset.

12. The facial analysis system of claim 9, wherein the first neural network is a convolutional neural network (CNN).

13. The facial analysis system of claim 9, wherein the first neural network and the RNN are simultaneously trained using one training dataset.

14. The facial analysis system of claim 9, wherein the sequence of image frames includes facial landmarks associated with the at least one head and,
    the first neural network is further configured to extract additional spatial features from the video data; and
    the RNN is further configured to process the additional spatial features for the two or more image frames in the sequence of image frames to produce facial landmark tracking data.

15. The facial analysis system of claim 14, wherein the facial landmark tracking data comprises three-dimensional positions.

16. The facial analysis system of claim 9, wherein the RNN is a fully connected RNN.

17. The facial analysis system of claim 9, wherein the video data comprises color values.

18. A non-transitory computer-readable media storing computer instructions for facial analysis that, when executed by one or more processors, cause the one or more processors to perform the steps of:
- transforming a fully-connected layer of a first neural network into a recurrent layer to produce a recurrent neural network (RNN), wherein, during training, the fully-connected layer learned a first weight matrix, and the recurrent layer uses the first weight matrix to process inputs to the recurrent layer and uses a second weight matrix to process hidden state produced by the recurrent layer for a previous timestep;
- receiving video data representing a sequence of image frames including at least one head;
- extracting spatial features comprising pitch, yaw, and roll angles of the at least one head from the video data by a second neural network; and
- processing, by the RNN, the spatial features for two or more image frames in the sequence of image frames to produce head pose estimates for the at least one head.

19. The method of claim 1, wherein, during additional training, the second weight matrix is learned by the RNN.

20. The method of claim 5, wherein the training dataset comprises a synthetic head pose dataset comprising video images and ground truth annotations.

* * * * *